Aug. 30, 1966         E. V. LEWIS         3,269,345
                       SHIP STABILIZER
Filed July 30, 1964                          3 Sheets-Sheet 1
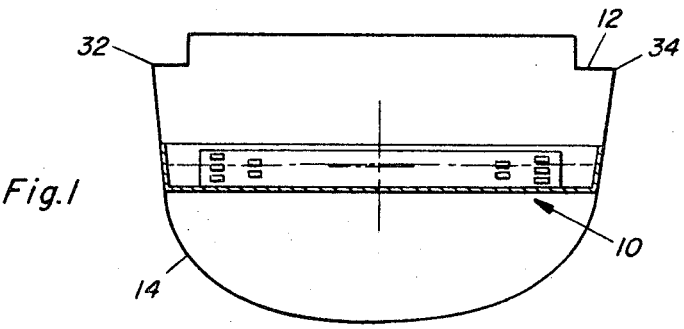
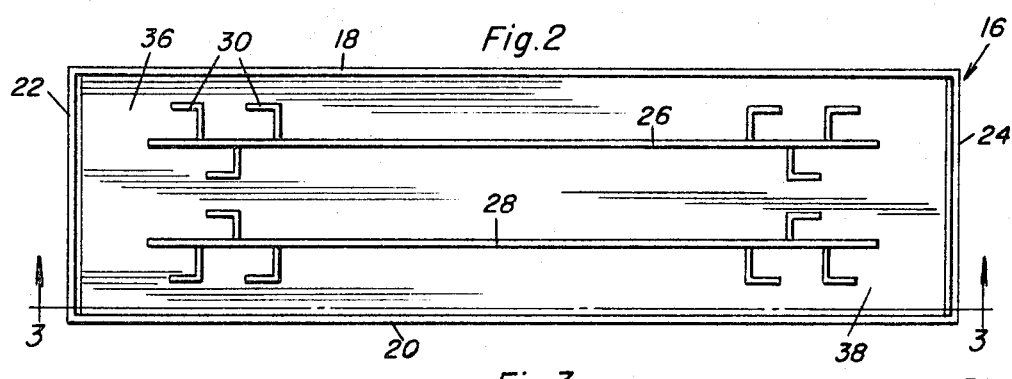
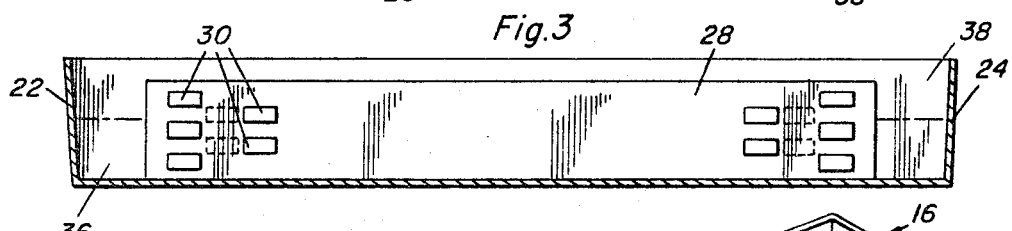
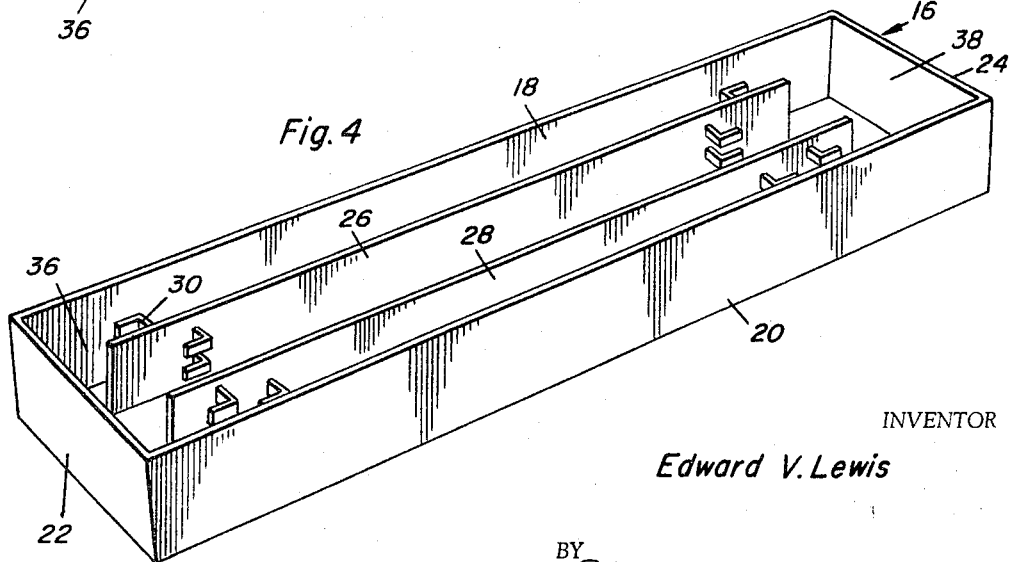
INVENTOR
Edward V. Lewis
BY
Stevens, Davis, Miller & Mosher
ATTORNEYS Aug. 30, 1966     E. V. LEWIS     3,269,345
SHIP STABILIZER
Filed July 30, 1964     3 Sheets-Sheet 2
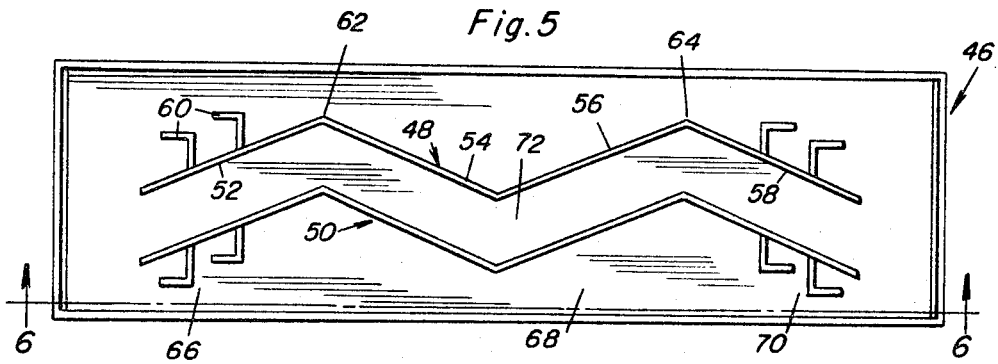
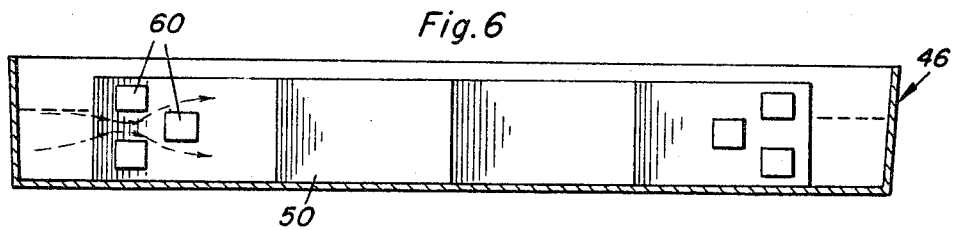
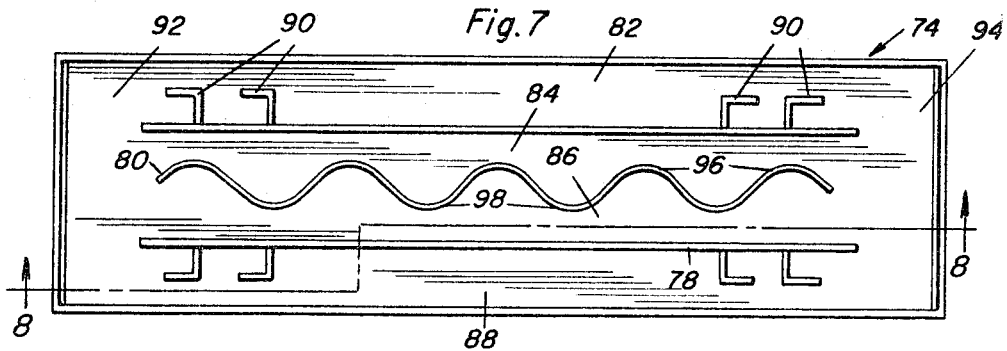
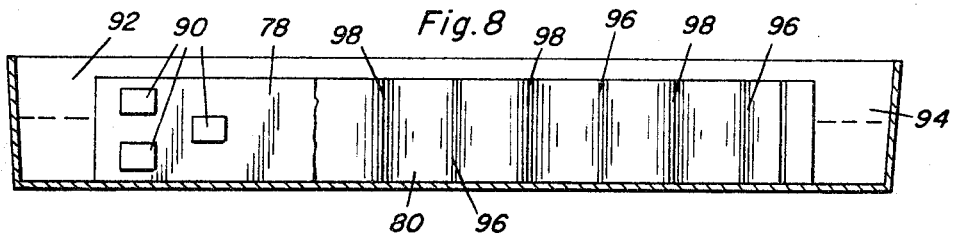
INVENTOR
Edward V. Lewis
BY
ATTORNEYS

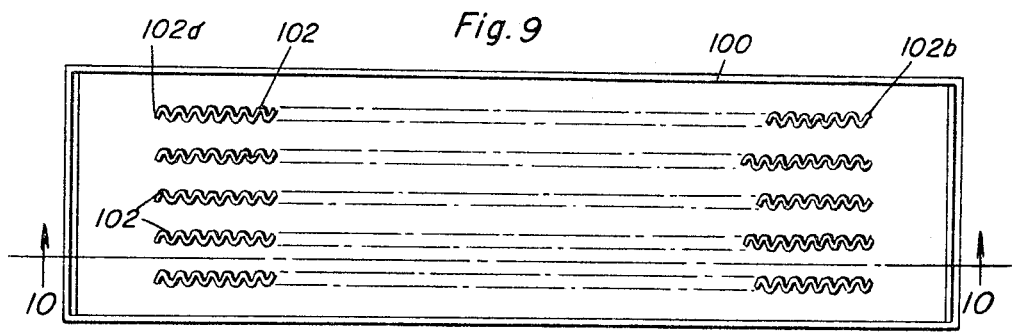
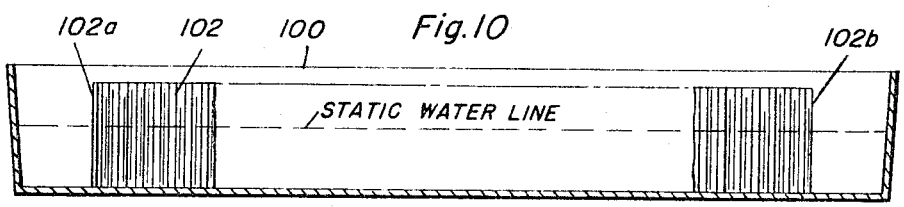
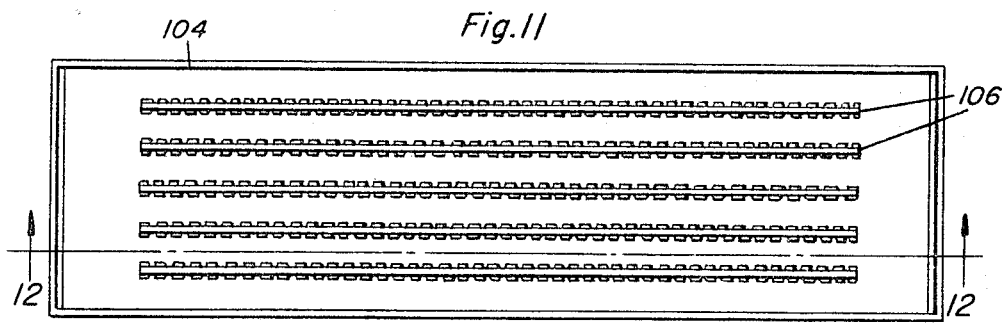
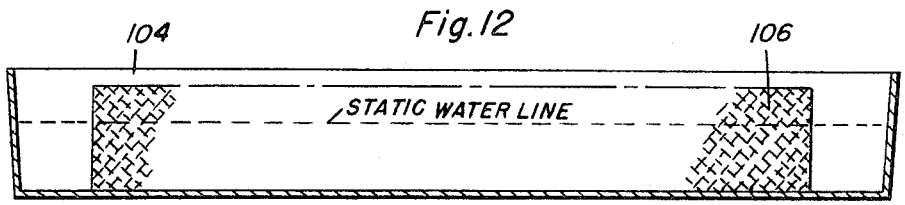

United States Patent Office 3,269,345
Patented August 30, 1966

3,269,345
SHIP STABILIZER
Edward V. Lewis, Glen Head, N.Y., assignor to John J. McMullen Associates, Incorporated, New York, N.Y., a corporation of New York
Filed July 30, 1964, Ser. No. 386,197
7 Claims. (Cl. 114—125)

The present invention relates generally to a ship stabilizer and more particularly an improved apparatus for applying a restoring moment by the movement of fluid within a tank.

Ships of practically every type encounter the problem of undesirable ship motion caused by the surface condition of water. Depending upon the type and size of the ship and the operating conditions to which the ship is to be subjected, various hull designs are selected to counteract the tendency of the water to impart motion to the ship. Due to the great number of variables present and since cyclic wave motion can cause a gradual increase in the energy of motion of the ship, hull design provides only a limited effect in controlling the ship motion. Other attempts to minimize ship motion in response to wave action include the provision of stabilization systems which are capable of applying a restoring moment to the ship when it is subjected to the motion. Particular emphasis has been made with respect to improving systems for minimizing roll. Ballast tanks connected by piping and the like have been employed in order to transfer water in a manner to generate a restoring moment. Such systems encounter the difficulty of maintaining the proper phasing between the restoring moment and motion imparted to the ship. Efforts to employ volumes of air above liquid ballast for controlling the ballast have resulted in massive systems which are uncertain as well as excessively noisy in operation. Efforts have also been directed to providing the ship with fin members extending from the hull beneath the water line and adapted to generate restoring moments from the hydrodynamic forces on the fins accompanying the motion of the ship. In certain applications controlled fins have been effective in controlling the roll of the ship but only with the expense of complex systems emplyoing massive fin members and operating machinery. Furthermore, controlled fins are generally effective only when the ship is under way with sufficient speed to cause drag resulting in a loss of ship speed.

In the past, stabilization systems have been primarily used in ships in which it is desired to have stabilization only when the ship is underway. The problem of stabilizing a stationary ship now, however, is of greater importance. For example, ships carrying radio equipment for aircraft navigation purposes are conventionally wired to be maintained on station in the mid-ocean for extended periods of time. Such ships may be maintained at a stationary point or operated at low speed about a stationary point. In defense systems radar picket ships, which again operate at a predetermined station, are employed to carry early warning radar equipment at extended distances from land. In the development of missile devices and space vehicles, it is necessary to maintain great numbers of ships on station throughout the oceans of the world in order to track and monitor the flight and path of operations of these devices. It is obvious that without sufficient degree of stabilization the equipment carried by any of these ships can be interfered with by excessive ship motion and rendered practically ineffective during a heavy sea condition.

Accordingly, it is the primary object of the present invention to provide a ship stabilizer which is capable of applying a restoring moment to the ship whether the ship is underway or stationary.

More particularly, it is an object of the invention to provide a ship stabilizer which is passive, that is, a stabilizer which applies the restoring moment directly in response to the movement of the ship about the axis about which the ship is to be stabilized without the need of control equipment.

Furthermore, it is an object of the invention to provide a ship stabilizer in which the movement of fluid in response to the movement of a ship is sufficiently opposed in order that the fluid can apply a restoring moment to the ship.

Another object of the invention is to provide a ship stabilizer which is passive in operation but which is adapted to be conveniently adjusted to compensate for changes in the condition of the ship or the sea.

A still further object of the invention is to provide a ship stabilizer which is relatively compact and of reasonable weight.

A further object of the invention is to provide a ship stabilizer which damps the movement of fluid therein so that better stability can be obtained and the degree of roll of the ship is held to a minimum.

In one embodiment of the invention the ship stabilizer comprises a tank containing a quantity of fluid having a free surface. The longitudinal axis of the tank is adapted to extend substantially horizontally and substantially at right angles to the axis about which the ship is to stabilized. Thus, if the ship is to be stabilized against roll, the tank is disposed in a substantially athwartship direction along one of the decks of the ship. In order to oppose the flow of fluid from one portion of the tank to the other in response to the movement of the ship, a plurality of flanges mounted on baffles are positioned in the tank for the purpose of impeding the flow of fluid in response to the roll of the ship. Said flanges and baffles also provide for damping kinetic energy of the mass of fluid arriving at the end of the tank to diminish the emission of a reflected wave therefrom.

One illustrated embodiment of the present invention has substantially uniplanar baffles with a plurality of flanges mounted thereon. Another illustrated embodiment of the invention has parallel baffle sections running in a zigzag course with flanges mounted at the extremities thereof. Still another embodiment of the invention has two parallel, stiffened, uniplanar plates mounted on either side of a stiffened corrugated plate. Yet another embodiment uses a plurality of uniplanar, stiffened plates having greatly corrugated or greatly roughened surfaces.

Other objects and features of the invention will become apparent in the following specification and claims in view of the drawings in which:

FIGURE 1 is a vertical section view showing the stabilizer extending across the ship below the decks;

FIGURE 2 is an enlarged plan view of the stabilizer showing the tank and the uniplanar baffles with the flanges mounted thereon;

FIGURE 3 is a sectional view taken along lines 3—3 of FIGURE 2;

FIGURE 4 is a perspective view of the embodiment shown in FIGURES 2 and 3;

FIGURE 5 is a plan view of a modification which includes baffles that run in a zigzag course;

FIGURE 6 is a side elevation sectional view taken along lines 6—6 of FIGURE 5;

FIGURE 7 is a plan view of another embodiment showing baffles mounted on either side of a corrugated plate;

FIGURE 8 is a sectional view taken along lines 8—8 of FIGURE 7;

FIGURE 9 is a plan view of another embodiment illustrating a plurality of greatly corrugated plates;

FIGURE 10 is a side elevation section taken along lines 10—10 of FIGURE 9;

FIGURE 11 is a plan view of yet another embodiment of the invention showing a plurality of roughened plates; and FIGURE 12 is a side elevation section taken along lines 12—12 of FIGURE 11.

Referring to the figures in detail, there is shown in FIGURE 1 a ship stabilizer generally indicated as stabilizer 10 mounted athwartship below decks 12 of ship 14. It can be seen, when the stabilizer 10 is partly filled with fluid, said stabilizer can perform passive stabilization whenever roll forces are applied to ship 14. The stabilizer comprises a tank 16 formed by sides 18 and 20 and ends 22 and 24. Tank 16 can have a top to prevent fluid spill; or the sides of the tank can extend between two decks, thus using the upper deck as a top. By extending the stabilizer across the hull of ship 14 the maximum moment arm for the liquid can be obtained. The stabilizer is proportioned in a manner such that the weight of the liquid which is displaced in a position adjacent an end portion thereof is sufficient to generate a restoring moment capable of restoring the motion of the ship for a range of sea conditions. The fluid within the tank has a free surface and can move in response to the motion of the ship. It can be seen, however, that once the moment force is created by the liquid to oppose the roll of the ship, the fluid mass velocity increases so that the fluid mass begins to move across the tank to the opposite end thereof. As will be described below, a portion of the kinetic energy of the moving mass will be absorbed by the flanges and plates so that a large reflected wave will not result. To increase the frictional forces and damping forces applied to the liquid, flanges 30 are mounted on both sides of the plates 26 and 28.

Thus it can be seen that any movement of the fluid resulting from a roll of the ship results in fluid friction, local turbulence and fluid impedance in the fluid imparted thereto by plates 26 and 28 and flanges 30 mounted thereon.

The fluid to be employed within the stabilizer can be any liquid or the like having sufficient density and with a viscosity of a sufficiently low magnitude so that flow can readily take place between the flanges 30 and the plates 26 and 28. Liquids such as sea water, fresh water, bunker oil or types of liquid cargo can be used in the stabilizer tank. Once the stabilizer has been designed and installed within the ship, the depth of fluid within the stabilizer can be varied for tuning the stabilizer to various conditions of the ship and sea.

In order for a restoring moment to be generated, it is necessary that the moment be substantially out of phase with the forces applied to the ship by the sea. Thus, in the case of roll, as the crest of the wave strikes along one side of the ship, the force resulting from the moment must be applied in opposition to the force of the wave. After the wave causes the ship to roll, it is necessary that the moment be reversed so that the force is applied to the opposite side of the ship.

Operation of the stabilizer will now be described. Let it be assumed that a wave strikes the ship such that the ship rolls to elevate side 32 and lower side 34. As side 32 rises, the friction imparted to the water by plates 26 and 28 and flanges 30 oppose the flow of the fluid from end portion 36 in the direction toward end portion 38. As side 32 approaches its maximum point of upward movement, a hydrostatic head is formed within the stabilizer so that flow passes in the direction of end portion 38. The potential energy of the fluid is maximum at the maximum elevation of side 32. The potential energy of the fluid in end portion 36 is converted into kinetic energy as the fluid mass begins to flow toward end portion 38. After side 32 is lowered and the ship passes through a level position, the fluid continues to flow in the direction of end portion 38 due to its kinetic energy. In this way it is seen that there is an accumulation of fluid in end portion 38 as the portion of the hull adjacent thereto attempts to be elevated by the sea or rolling forces. As the mass of fluid arrives at end portion 38, a portion of the kinetic energy thereof is absorbed by the flanges 30 and plates 26 and 28, and an impedance to a reflected wave is also imparted to the fluid by said flanges and plates. Also, the flanges 30 associated with plates 26 and 28 in the vicinity of end portion 38 retard or impede an immediate reversal of flow as side 34 of the ship rises so that fluid can present a restoring moment in opposition of the rising side 34. This process then continues so long as sea forces are applied to the hull to cause it to move about and roll about the axis of the ship.

It should be understood that the number of plates, such as 26 and 28, can be increased and the number and sizes of the flanges 30 can be changed without departing from the spirit of the present invention.

Refering now to FIGURES 5 through 7, there is shown a stabilizing tank 46 and mounted therein two upstanding plate members 48 and 50, each having four sections 52, 54, 56 and 58, disposed in angular positions. Each corresponding section of one plate is substantially parallel to that of the other. Mounted on sections 52 and 58 there is found flanges 60 which function in the same manner as described above. The purpose of the zigzag path for plates 48 and 50 is to aid in the impedance and damping processes, whereby the area of flow of the fluid is restricted in areas 62, 64, 68 and 70 of tank 46. Also, the center passageway 72 aids in the fluid impedance and damping by causing a number of changes of direction of fluid flow to dissipate energy.

It should be understood that the number of plates within tank 46 and the number of sections per plate and the number of and dimensions of flanges found thereon may be varied without departing from the scope of this invention.

The embodiment of the invention shown in FIGURES 7 and 8 will now be described. The stabilizer found in said figures comprises tank 74, in which vertically disposed plates 76 and 78 are mounted. An undulating or corrugated plate 80 is mounted between said plates 76 and 78 whereby substantially parallel fluid passageways 82, 84, 86 and 88 are defined. Flanges 90 are mounted at the ends of plates 76 and 78 and perform the same function as flanges 30 and 60 described above. The cooperation between corrugated plates 80 and plates 76 and 78 serves to perform a fluid impedance and damping function in the following manner: when end portion 92 is raised and end portion 94 is lowered, and the fluid in passageways 84 and 86 begins to move toward end portion 94, said movement is impeded because the portions 96 of plate 80 which are closest to plate 76 decrease the area through which the fluid can pass and therefore impede its flow. Similarly, the portions 98 of plate 80 nearest plate 78 reduce the area of the fluid flow and therefore impede said flow. The plates 76, 78 and 80 are made of substantially unyielding material, such as iron, so that the impedance imparted thereby is a maximum in accordance with the design. When the fluid mass arrives at end portion 94, the plates function to dampen the kinetic energy imparted to said mass by causing said moving mass to assume many changes of direction. Flanges 90 and plates 76, 78 and 80 then cooperate to reduce the propagation of a reflected wave and also prevent the immediate reversal of the fluid mass due to the then raising end portion 94.

It is to be understood that the number of plates, passageways, flanges and dimensions thereof, and the number and type of corrugated plates may be varied without departing from the spirit of the invention.

Referring now to the embodiment of the invention shown in FIGURES 9 and 10, there is disclosed an elongated fluid containing means 100 having a plurality of upstanding stiffened plates 102 mounted in a vertical position and extending substantially parallel to the longitudinal axis of said tank 100. Stiffened plates 102 are greatly corrugated and the axes of the undulations are substantially vertically disposed. Said stiffened plates 102 define a plurality of parallel liquid passageways through which the liquid within tank 100 flows in response to the roll of the ship as described above. It can be seen that the ends 102a and 102b of the plates are spaced from the ends of tank 100 as the liquid is transferred through the passageways defined by stiffened plates 102. The kinetic energy thereof is dissipated due to the fluid friction imparted by the corrugations on said plates. The operation of this system is substantially the same as that described above.

Referring now to the embodiment of the invention shown in FIGURES 11 and 12, there is provided another elongated stabilizer tank 104 and a plurality of vertically mounted stiffened plates 106 extending substantially parallel to the longitudinal axis of said tank 104. Stiffened plates 106 define a plurality of fluid passageways through which the transferring fluid within tank 104 flows in response to the roll of the ship. Stiffened plates 106 have roughened surfaces on either side thereof for the purpose of imparting fluid friction to the transferring fluid in tank 104.

Again, as the fluid flows through the passageways defined by said stiffened plates 106, the kinetic energy of said fluid is dissipated due to the fluid friction imparted thereto. The operation of the system is substantially the same as that described above.

It should be further understood that the stabilizer is adapted for stabilizing other axes of the ship. Furthermore, the stabilizer is not limited to ship installations but can be employed with other vehicles or platforms that are subject to disturbances of the supporting medium.

Moreover, depending upon design specifications, the damping and impeding forces may be imparted to some degree by the cooperation between the plates and tank sides without the use of the fluid friction means or flanges without departing from the spirit of the invention.

While there has been disclosed what at present are considered to be preferred embodiments of the invention, it is to be understood that changes and modifications can be made therein without departing from the essential spirit of the invention. It is intended therefore in the appended claims to cover all such changes and modifications within the true scope of the invention.

What is claimed is:

1. A ship stabilizer comprising an elongated fluid containing means for holding a fluid in all parts of said containing means, the longitudinal axis of said containing means extending parallel to the plane in which stabilization is to be imparted, at least one upstanding plate longitudinally mounted within said containing means and spaced from the ends thereof, said plate together with said containing means defining a plurality of longitudinally directed fluid passageways within said containing means, said plate including a plurality of flange members mounted at opposite ends thereof, said flange members positioned in vertical spaced relationship with respect to each other on at least one side of said plate and operative to impede the transfer of fluid within said containing means and damp the kinetic energy of the moving fluid.

2. The apparatus as claimed in claim 1 wherein said containing means includes a plurality of horizontally spaced upstanding plates longitudinally mounted within said containing means and spaced from the ends thereof, each of said plates including a plurality of flange members mounted at opposite ends thereof, said flange members positioned in vertical spaced relationship with respect to each other on at least one side of said plate and operative to impede the transfer of fluid within said containing means and damp the kinetic energy of the moving fluid.

3. The apparatus as claimed in claim 2 wherein said containing means has substantially vertical sides, said sides together with said plates defining a plurality of longitudinally directed fluid passageways.

4. A ship stabilizer as set forth in claim 2, wherein said plates comprise a plurality of uniplanar plates and positioned in planes substantially parallel to the longitudinal axis of said containing means.

5. A ship stabilizer as set forth in claim 4, wherein said flange members are mounted on both sides of at least one of said plates.

6. A ship stabilizer as set forth in claim 5, further comprising at least one upstanding corrugated plate mounted within said containing means and positioned between at least two uniplanar surfaces, whereby said said corrugated plate cooperates with the uniplanar surface to impede the moving fluid.

7. A ship stabilizer as set forth in claim 2, wherein said plates comprise a plurality of sections disposed in angular relationships to each other, said sections cooperating with said containing means for defining a plurality of restricted passageways to impede the movement of fluid therethrough.

References Cited by the Examiner
UNITED STATES PATENTS 3,155,066  11/1964  Field _____ 114—125

MILTON BUCHLER, *Primary Examiner.*

T. M. BLIX, *Assistant Examiner.*